United States Patent [19]
Tsai et al.

[11] Patent Number: 5,945,221
[45] Date of Patent: *Aug. 31, 1999

[54] BIAXIAL ORIENTATION OF FLUOROPOLYMER FILMS

[75] Inventors: Mingliang Lawrence Tsai, Holmdel; Yash Paul Khanna, Morristown; Joseph Edgar Mackey, East Hanover, all of N.J.; Russell Lee Schneider, Sun Prairie, Wis.; Alfieri Degrassi, Pottsville, Pa.

[73] Assignee: AlliedSignal Inc., Morris Township, N.J.

[*] Notice: This patent is subject to a terminal disclaimer.

[21] Appl. No.: 08/763,138

[22] Filed: Dec. 10, 1996

Related U.S. Application Data

[60] Provisional application No. 60/020,497, Jun. 20, 1996.

[51] Int. Cl.$^6$ ............................ B32B 27/08; B32B 27/32; B32B 27/34; B32B 27/36
[52] U.S. Cl. ............................ 428/412; 428/421; 428/422; 428/474.4; 428/476.3; 428/476.9; 428/480; 428/483; 428/515; 428/516; 428/520; 428/522; 428/523; 428/910; 264/173.13; 264/173.14; 264/173.15; 264/173.16
[58] Field of Search ............................ 428/910, 421, 428/422, 480, 483, 522, 412, 427.4, 476.3, 476.9, 515, 516, 520, 523; 264/173.11, 173.12, 173.14, 173.15, 173.16, 288.4, 290.2; 156/244.11, 244.24, 297, 299, 300, 308.2, 309.6

[56] References Cited

U.S. PATENT DOCUMENTS

| | | | |
|---|---|---|---|
| 3,355,347 | 11/1967 | Haberman | 161/189 |
| 3,908,070 | 9/1975 | Marzolf | 428/474 |
| 4,011,874 | 3/1977 | Segawa et al. | 128/362 |
| 4,510,301 | 4/1985 | Levy | 526/254 |
| 4,519,969 | 5/1985 | Murakami | 264/210 |
| 4,544,721 | 10/1985 | Levy | 526/249 |
| 4,585,694 | 4/1986 | Dehennau | 428/355 |
| 4,659,625 | 4/1987 | DeCroly et al. | 428/412 |
| 4,677,017 | 6/1987 | DeAntonis et al. | 428/214 |
| 5,139,878 | 8/1992 | Kim et al. | 426/421 |
| 5,234,524 | 8/1993 | Ozu et al. | 156/327 |
| 5,328,536 | 7/1994 | Rohleder et al. | 156/229 |
| 5,429,696 | 7/1995 | Rohleder et al. | 156/220 |
| 5,480,721 | 1/1996 | Pozzoli et al. | 428/422 |

FOREIGN PATENT DOCUMENTS

| | | |
|---|---|---|
| 0 132 583 | 2/1985 | European Pat. Off. . |
| WO 97 48553 | 12/1997 | WIPO . |

OTHER PUBLICATIONS

Schmitz, Peter et al., "Films." Ullmann's Encyclopedia of Industrial Chemistry, 5th Ed., vol. A11, pp. 85–94, Jan. 1988.

*Primary Examiner*—Vivian Chen
*Attorney, Agent, or Firm*—Roger H. Criss

[57] ABSTRACT

The present invention provides biaxially oriented multilayer fluoropolymer films. They are produced by coextruding or laminating films having at least one layer of a fluoropolymer, at least one layer of a thermoplastic homopolymer or copolymer and an intermediate adhesive layer which is preferably a polyolefin having at least one functional moiety of an unsaturated carboxylic acid or anhydride thereof. With this structure the thermoplastic layer allows the fluoropolymer layer to be biaxially stretched many times its original length. A high orientation ratio for the fluoropolymer film increases the mechanical strength, toughness, and water vapor barrier properties of the film while using a thinner gauge fluoropolymer film. Coextrusion processing can be done at higher temperatures, i.e. in the range of from at about 280° C. to about 400° C. These temperatures allow films to be produced in the absence of polymer degradation and film melt fracture.

27 Claims, No Drawings

BIAXIAL ORIENTATION OF FLUOROPOLYMER FILMS

This application claims the benefit of provisional application 60/020,497 filed Jun. 20, 1996.

CROSS-REFERENCE TO RELATED APPLICATIONS

Reference is made to U.S. application Ser. No. 08/690712 filed Jul. 31, 1996 U.S. Pat. No. 5,874,035, which also claims the benefit of the above-mentioned provisional application.

BACKGROUND OF THE INVENTION

1. Field of the Invention

The present invention relates to oriented multilayer films. More particularly, the invention pertains to coextruded or laminated films having at least one layer of a fluoropolymer such as poly(chlorotrifluoro ethylene) (PCTFE) homopolymer or copolymer, a layer of a thermoplastic homopolymer or copolymer and an intermediate adhesive layer which is preferably a polyolefin having at least one functional moiety of an unsaturated carboxylic acid and/or anhydride thereof.

2. Description of the Prior Art

It is well known in the art to produce oriented polymeric films. See, e.g. U.S. Pat. No. 4,011,874. However, such films tend to expand in the direction perpendicular to the direction of stretching.

It is also known in the art to produce single layer and multilayer fluoropolymer films. See, e.g. U.S. Pat. Nos. 4,677,017; 4,659,625 and 5,139,878. As shown in U.S. Pat. No. 4,011,874, polymers may be melt extruded through an orifice, and the molten polymer quickly quenched and then drawn. Although the moisture and vapor barrier properties of oriented fluoropolymer film has been known for years, successful film orientation has been exceedingly difficult due to technical difficulties during the casting and orientation processes. Such films tend to expand in the direction perpendicular to the direction of stretching. PCTFE is exceptionally difficult to orient due to its extremely fast crystallization rate and thermally induced self-orientation. Its fast crystallization rate produces a highly crystalline structure that hinders orientation and actually prevents further orientation beyond a certain point. Its thermally induced self-orientation results in a film which, upon unconstrained heating, self extends in the machine or longitudinally stretched direction and shrinks in the transverse direction.

Most earlier attempts to stretch PCTFE films have failed either due to its high degree of film crystallinity, nonuniform crystallinity, self-orientation or a combination of these factors. Prior art studies of the orientation of PCTFE homopolymer report a limit of a three to four times orientation or stretch ratio in either the machine direction (MD) or transverse direction (TD). For example, U.S. Pat. No. 4,544,721 describes a substantially amorphous chlorotrifluoroethylene polymer monolayer film which is oriented at least 2.5 times its original length, but no more than five times in the MD. It also discloses therein that attempts to stretch crystalline PCTFE result in films that contain holes or tears, or which are uneven in thickness. Other known attempts to stretch PCTFE homopolymer more than five times its unstretched length result in film fibrilation and ultimate breakage. See, e.g. U.S. Pat. No. 4,510,301 (orients film containing a copolymer of 40 to 60 mole percent ethylene and chlorotrifluoroethylene). U.S. Pat. No. 4,519,969 discloses a biaxially stretched film and a method for the manufacture thereof, containing at 90 mole % of ethylene-tetrafluoroethylene copolymer having a specific crystallization property. Various attempts have also been made to produce a multilayer fluoropolymer film structure, with most emphasis focused on the selection of the adhesive materials. U.S. Pat. No. 4,677,017 discloses coextruded multilayer films which include at least one fluoropolymer and at least one thermoplastic film which are jointed by the use of an adhesive polymer, particularly ethylene/vinyl acetate resins. U.S. Pat. No. 4,659,625 discloses a fluoropolymer multilayer film structure which utilizes a vinyl acetate polymer as an adhesive layer. U.S. Pat. No. 5,139,878, which is incorporated herein by reference, discloses a fluoropolymer film structure using an adhesive layer selected from the group consisting of alkyl ester copolymers of an olefin, the modified polyolefins, and their blends. U.S. Pat. No. 3,355,347 relates to a laminated film of poly(chlorotrifluoroethylene) and plasticized poly(vinyl chloride) using a polymerized ethylene imine.

It would be desirable to produce a much more highly oriented, dimensionally stable fluoropolymer film since as the degree of attainable orientation is increased, the properties of mechanical strength, toughness, and water vapor barrier capability are significantly improved without increasing the film gauge. It would also be desirable to produce a multilayered film structure which is dimensionally stable and uniform across its entire width. Through coextrusion of fluoropolymer films with another polymer or polymers it is now possible that fluoropolymer films can be easily biaxially oriented. Not only can fluoropolymers be stretched uniaxially in either the longitudinal or transverse directions, but such films can also be biaxially oriented simultaneously or sequentially. Significant improvement in properties are observed in such biaxially oriented films, i.e., tensile modulus, mechanical properties, toughness, water vapor transmission rate and barrier properties. Achieving a high barrier fluoropolymer film through orientation would be useful for medical packaging, pharmaceutical packaging and other industrial uses.

SUMMARY OF THE INVENTION

The invention provides a multilayer film which comprises at least one fluoropolymer layer and at least one thermoplastic layer comprising at least one thermoplastic homopolymer or copolymer, attached to a surface of the fluoropolymer layer by an intermediate adhesive layer, which film has been biaxially stretched at least 1.5 times in each of its longitudinal and transverse directions, and wherein each of the fluoropolymer layer, adhesive layer and thermoplastic layer have a viscosity of less than or equal to about 10,000 Pascal seconds at a temperature in the range of from about 280° C. to about 400° C.

The invention also provides a method of producing an oriented, multilayer film which comprises coextruding at least one layer of a fluoropolymer, and at least one thermoplastic layer comprising a thermoplastic homopolymer or copolymer attached to a surface of the fluoropolymer layer by a coextruded intermediate adhesive layer, wherein said coextruding is conducted at a temperature of from about 280° C. to about 400° C.; casting the film and then biaxially stretching the film at least 1.5 times in each of its longitudinal and transverse directions.

The invention further provides a method of producing an oriented, multilayer film which comprises laminating at least one layer of a fluoropolymer to the surface of a layer of a thermoplastic homopolymer or copolymer by an intermediate adhesive layer, which intermediate adhesive layer is comprised of a polyolefin having at least one functional moiety of an unsaturated carboxylic acid anhydride and then biaxially stretching the film article at least 1.5 times in each of its longitudinal and transverse directions.

The invention still further provides an article which is thermoformed from the above-described film.

The invention also provides a multilayer film which comprises at least one fluoropolymer layer and at least one thermoplastic layer comprising at least one non-polyolefin thermoplastic homopolymer, non-polyolefin containing copolymer or blends thereof, attached to a surface of the fluoropolymer layer by an intermediate adhesive layer comprised of at least one polyolefin having at least one functional moiety of an unsaturated carboxylic acid or anhydride thereof, which film has been uniaxially stretched at least five times in one linear direction, and wherein each of the fluoropolymer layer, adhesive layer and thermoplastic layer have a viscosity of less than or equal to about 10,000 Pascal seconds at a temperature in the range of from about 280° C. to about 400° C.

The present invention achieves a highly oriented fluoropolymer containing film by producing a multilayer structure by either a coextrusion or a lamination process. With this structure, the thermoplastic layer allows the fluoropolymer containing layer to be stretched up to ten times its original length. It has been further found that when fluoropolymer films are coextruded with a thermoplastic film, and adhered with an intermediate adhesive layer at a temperature range of from about 280° C. to about 400° C., a stable, uniform film is produced.

DETAILED DESCRIPTION OF THE PREFERRED EMBODIMENT

For purposes of this invention, the terms "orienting" and "stretching" shall be used interchangeably. As used herein, "copolymers" shall include polymers having two or more monomer components.

The fluoropolymer layer may be comprised of PCTFE homopolymers or copolymers or blends thereof as are well known in the art and are described in, for example, U.S. Pat. Nos. 4,510,301; 4,544,721; and 5,139,878. Of these, particularly preferred fluoropolymers suitable to form multilayer barrier films of the present invention include homopolymers and copolymers of chlorotrifluoroethylene and copolymers of ethylene-chlorotrifluoroethylene. Such copolymers may contain up to 10%, and preferably up to 8% by weight of other comonomers such as vinylidine fluoride and tetrafluoroethylene. Most preferred are chlorotrifluoroethylene homopolymers and copolymers of chlorotrifluoroethylene and vinylidine fluoride and/or tetrafluoroethylene. Such may are available as ACLON® resin from AlliedSignal Inc. of Morristown, N.J.

Adjacent to the fluoropolymer layer is an adhesive layer, also referred to in the art as a "tie" layer, between each film layer. In accordance with the present invention, suitable adhesive polymers include modified polyolefin compositions having at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. Of these, the most preferred is maleic anhydride. The modified polyolefins suitable for use in this invention include compositions described in U.S. Pat. Nos. 3,481,910; 3,480,580; 4,612,155 and 4,751,270 which are incorporated herein by reference. Other adhesive layers non-exclusively include alkyl ester copolymers of olefins and alkyl esters of α,β-ethylenically unsaturated carboxylic acids such as those described in U.S. Pat. No. 5,139,878. The preferred modified polyolefin composition comprises from about 0.001 and about 10 weight percent of the functional moiety, based on the total weight of the modified polyolefin. More preferably the functional moiety comprises from about 0.005 and about 5 weight percent, and most preferably from about 0.01 and about 2 weight percent. The modified polyolefin composition may also contain up to about 40 weight percent of thermoplastic elastomers and alkyl esters as described in U.S. Pat. No. 5,139,878.

Adjacent the adhesive layer is a thermoplastic layer which non-exclusively includes a material selected from the group consisting of polyolefins, polyamides, polyesters, polystyrene, polycarbonates, vinyl polymers, and copolymers and blends thereof. Most preferred are polyester and polyamides.

Although each layer of the multilayer film structure may have a different thickness, the thickness of each of the fluoropolymer and thermoplastic layers of the films in the post-stretched multilayer films structure is preferably from about 0.05 mils (1.3 μm) to about 100 mils (2540 μm), and more preferably from about 0.05 mils (1.3 μm) to about 50 mils (1270 μm). The thickness of the post-stretched adhesive layer may vary, but is generally in the range of from about 0.02 mils to about 12 mils (305 μm), preferably from about 0.05 mils (1.3 μm) to about 1.0 mils (25 μm), and most preferably from about 0.1 mils (25 μm) to about 0.8 mils (20 μm). While such thicknesses are preferred as providing a readily flexible film, it is to be understood that other film thicknesses may be produced to satisfy a particular need and yet fall within the scope of the present invention; such thicknesses which are contemplated include plates, thick films, and sheets which are not readily flexible at room temperature (approx. 20° C.).

In the preferred embodiment, each of the fluoropolymer layer, adhesive layer and thermoplastic layer have on average no embedded particles having a diameter of greater than about 800 μm, no more than about 22 particles having a diameter of from about 400 to about 800 μm, no more than about 215 particles having a diameter of from about 200 to about 400 μm and no more than about 538 particles having a diameter of from about 100 to about 200 μm per square meter of film and wherein each of the fluoropolymer layer, adhesive layer and thermoplastic layer have on average no more than about 0.36 embedded bubbles having a diameter of greater than about 3100 μm, no more than about 22 bubbles having a diameter of from about 1500 to about 3100 μm, and no more than about 161 bubbles having a diameter of less than about 1500 μm per square meter of film. These may be determined by using a Systronics Eagle Automatic Inspection System manufactured by Systronics, Inc. This allows for an extremely clear film having less likelihood of breaking or tearing. Each of the each of the fluoropolymer layer, adhesive layer and thermoplastic layer materials have a melt viscosity of less than or equal to about 10,000, preferably from about 3,000 to about 10,000 Pascal seconds at a temperature in the range of from about 280° C. to about 400° C., and preferably from about 285° C. to about 370° C.

The multilayer films of the present invention can have a variety of structures so long as there is an adhesive layer between each polymer layer. A typical film structure includes a three-layer structure, which comprises a thermoplastic layer, an adhesive layer and a fluoropolymer layer. Another typical film structure is a five-layer structure, which comprises a thermoplastic layer, an adhesive layer, a fluoropolymer layer, an adhesive layer and a thermoplastic layer. These are only two of many possible combinations of multilayer film structures, and any variation of the order and thickness of the layers of the fluoropolymer and thermoplastic layer can be made.

The multilayer films of this invention may be produced by conventional methods useful in producing multilayer films, including coextrusion and extension lamination techniques. Suitable coextrusion techniques are described in U.S. Pat. Nos. 5,139,878 and 4,677,017 except coextrusion in this invention is conducted at from about 280° C. to about 400° C., preferably from about 285° C. to about 370° C. If coextrusion is performed at a higher temperature, the film polymers tend to degrade significantly and lose their film properties. If coextrusion is done at a lower temperature, the film has a non-uniform, hazy pattern indicative of melt fracture. Coextrusion techniques include methods which include the use of a feed block with a standard die, a multimanifold die such as a circular die, as well as a multimanifold die such as used in forming multilayer films for forming flat cast films and cast sheets.

One advantage of coextruded films is the formation of a multilayer film in a one process step by combining molten layers of each of the film layers of fluoropolymer, tie layer composition, and thermoplastic, as well as optionally more film layers, into a unitary film structure. In order to produce a multilayer film by a coextrusion process, it is necessary that the constituents used to form each of the individual films be compatible with the film extrusion process. The term "compatible" in this respect means that the film-forming compositions used to form the films have melt properties which are sufficiently similar so as to allow coextrusion. Melt properties of interest include, for example, melting points, melt flow indices, apparent viscosity, as well as melt stability. It is important that such compatibility be present to assure the production of a multilayer film having good adhesion and relatively uniform thickness across the width of the film being produced. As is known in the art, film-forming compositions which are not sufficiently compatible to be useful in a coextrusion process frequently produce films having poor interfacial lamination, poor physical properties as well as poor appearance.

One skilled in the art can readily weigh the above-noted compatibility in order to select polymers having desirable physical properties and determine the optimal combination of relative properties in adjacent layers without undue experimentation. If a coextrusion process is used, it is important that the constituents used to form the multilayer film be compatible within a relatively close temperature range in order to permit extrusion through a common die. It has been found that the variation of the quantity of the modified polyolefin within the tie layer composition provides an adhesive layer forming composition which is of sufficiently high melt viscosity, especially in the preferred range of compositions described above, to be particularly useful in a coextrusion process with the fluoropolymer film forming composition, and with a film forming composition.

Alternatively, the multilayer films of the present invention can be produced by lamination whereby a multilayer film structure is formed from pre-fabricated film plies. The basic methods used in film laminating techniques are fusion, wet combining, and heat reactivating. Fusion, which is a method of laminating two or more film plies using heat and pressure without the use of other adhesives can only be used where the films being laminated are comprised of polymers that readily form interfacial adhesion. Wet combining and heat reactivating are utilized in laminating incompatible films using adhesive materials.

Typically, laminating is done by positioning the individual layers of the inventive film on one another under conditions of sufficient heat and pressure to cause the layers to combine into a unitary film. Typically the fluoropolymer, adhesive, and thermoplastic layers are positioned on one another, and the combination is passed through the nip of a pair of heated laminating rollers by techniques well known in the art such as those described in U.S. Pat. No. 3,355,347 which is incorporated herein by reference. Lamination heating may be done at temperatures ranging from about 120° C. to about 175° C., preferably from about 150° C. to about 175° C. at pressures ranging from about 5 psig (0.034 MPa) to about 100 psig (0.69 MPa) for from about 5 seconds to about 5 minutes, preferably from about 30 seconds to about 1 minute.

The multilayer film, whether comprising or three or more layer structure, may be stretched or oriented in any desired direction using methods well known to those skilled in the art. Examples of such methods include those set forth in U.S. Pat. No. 4,510,301. In such a stretching operation, the film may be stretched uniaxially in either the direction coincident with the direction of movement of the film being withdrawn from the casting roll, also referred to in the art as the "machine direction", or in as direction which is perpendicular to the machine direction, and referred to in the art as the "transverse direction", or biaxially in both the machine direction and the transverse direction. The multilayered film of the invention are particularly useful for forming thermoformed three dimensionally shaped articles such as blister packaging for pharmaceuticals. This may be done by forming the film around a suitable mold and heating in a method well known in the art.

We have unexpectedly found that the fluoropolymer films of the present invention have sufficient dimensional stability to be stretched at least 1.5 and preferably more than three times and more preferably from more than three times to about ten times in either the machine direction or the transverse direction or both.

Another noteworthy characteristic of the films of the present invention is that they exhibit improved tensile modulus, mechanical strength, and the most significantly of all, excellent barrier properties towards both water vapor and oxygen at 100% relative humidity after being stretched five or more times its original length uniaxially in either machine direction or transverse direction.

Water vapor transmission rate (WVTR) may be via the procedure set forth in ASTM F1249. In the preferred embodiment, the multilayered film according to this invention has a WVTR of from about 0.001 to about 0.05 gm/100 in$^2$/day per mil thickness of PCTFE, preferably from about 0.002 to about 0.02 gm/100 in$^2$/day per mil thickness of PCTFE, and more preferably from about 0.002 to about 0.01 gm/100 in$^2$/day per mil thickness of PCTFE. For example, a three layered film having a PCTFE/adhesive layer/ polyolefin layer structure which is oriented six times its original length in the machine direction possesses a WVTR of 0.0051 gm/100 in$^2$/day per mil thickness of PCTFE which is 200% better than the unoriented equivalent sample (WVTR 0.017 gm/100 in$^2$/day per mil thickness) and almost 100% better than an equivalent film sample stretched only three times its original length (0.0098 gm/100 in$^2$/day per mil thickness.

Oxygen transmission rate (OTR) may be via the procedure of ASTM D-3985 using an OX-TRAN 2/20 instrument manufactured by Modern Controls, Inc., operated at 73° F., 90% RH. In the preferred embodiment, the multilayered film according to this invention has an OTR of from about 0.1 to about 10 cc/100 in$^2$/day per mil thickness of PCTFE, preferably from about 0.5 to about 5 cc/100 in$^2$/day per mil thickness of PCTFE, and more preferably from about 0.5 to about 3 cc/100 in²/day per mil thickness of PCTFE. The following non-limiting examples serve to illustrate the invention.

EXAMPLES

In the following examples, polymers were coextruded in a melt coextrusion system equipped with a multilayer film die. The extrudate was quenched onto a cast roll before wound up into a roll. The orientation was then performed in a laboratory stretcher immediately after the cast films were made. The physical drawing of the fluoropolymers can be accomplished by methods known in the art employing commercially available equipment. Equipment found to be suitable is available from T. M. Long Company, Somerville, N.J. U.S.A. The operation of the laboratory film stretcher employed in all of the following examples is based on the movement of two draw bars at right angles to each other upon hydraulically driven rods. These pairs of draw bars, to which the four edges of a film specimen are attached, form the two axes at right angles to each other along which a specimen is stretched in any desired stretch ratio. Films can be stretched in one or both directions independently or in both directions simultaneously. The stretching may be done at any selected constant rate adjustable from 0.51 to 50.8 cm per second or at any constant force from zero to 11.3 kg per inch of edge before stretching. Nominal sample size before stretching is 10 cm by 10 cm between grips for stretching under 4 times original size. For stretching between 4 times and 7 times original size, the sample size is 6 cm×6 cm. Specimens may be heated in a controlled manner during the stretching cycle, similar to the commercial tenter oven. The following examples employed a constant stretch rate of 25.3 cm per second and a stretch temperature at 90–100° C. with six seconds pre-heating at a temperature within the same range. Alternatively, and preferably for commercial purposes, the drawing process is conducted continuously in high production rates, i.e., multistage roll drawing equipment, tenter frame, bubble blown equipment, available from various equipment manufacturers including Marshall and Williams in U.S.A., Bruckner Maschinenbau GmbH in Germany, etc. The multistage roll drawing equipment operates the drawing on extruded sheets or film stocks by a series of steps between heated rolls rotating at different and increasing speeds. Both tenter frame drawing and the bubble blown drawing processes are also well known in the art.

Example 1

Poly(chlorotrifluoroethylene) (PCTFE) homopolymer (density: 2.11 gm/cc, melting temperature: 211° C., Zero Strength Test (ASTM D1430): 128, made by AlliedSignal Inc.), after drying for four hours at 121° C., was extruded through a 3.2 cm (1¼") diameter Killion single screw extruder (L/D=24/1) equipped with three heating zones and two adaptors. The extruder temperature profile was set at 277° C., 282° C., and 288° C. for the zone 1–3, and the adaptors were maintained at 288° C. The melt temperature was measured at 286° C. The extrudate, after passing through a coextrusion film die maintained at 282° C., was then cast on a roll kept at 38° C., followed by a cooling roll set at 32° C. The resultant film had a thickness of 25 μm. Films with various thickness up to 150 μm were also made for subsequent stretching experiment, which was performed in a laboratory stretcher immediately after the cast films were made. The laboratory stretcher was set at 100° C. Cast film samples were cut either 10 cm×10 cm or 6 cm×6 cm, depending on the intended stretching ratio. For example, 10 cm×10 cm size was prepared for stretching ratio below four times. For those which were stretched more than four times, 6 cm×6 cm cast film samples were used. These film samples were then loaded into the Laboratory Stretcher equipped with grips along all four edges by a clip system. After six seconds preheating at 100° C., the samples were stretched at constant stretch rate controlled at 25.3 cm per second to a desired stretch ratio, which was preset on the draw bar in the stretcher before the experiment. Films so obtained were then tested for their properties.

In attempts to stretch PCTFE homopolymer monolayer film, there was limited success in 4X uniaxial orientation, as characterized by a low orientability of 0.1 (average of 10% success rate) in Table 1. The best stretching was observed on samples stretched three times its original length uniaxially, which shows a 0.5 orientability. However, in all attempts to stretch PCTFE homopolymer biaxially either sequentially or simultaneously, the film always fibrilates and ultimately breaks. The physical properties of a cast monolayer PCTFE homopolymer film are listed in Table 1, 2, and 3 as control.

Example 2

PCTFE copolymerized with 3.6% of vinylidene fluoride (density: 2.09 gm/cc, melting temperature: 190° C., made by AlliedSignal Inc.), after drying for four hours at 121° C., was extruded through a 3.2 cm (1¼") diameter Killion single screw extruder (L/D=24/1) equipped with three heating zones and two adaptors. The extruder temperature profile was set at 277° C., 282° C., and 288° C. for the zone 1–3, and the adaptors were maintained at 288° C. The melt temperature was measured at 285° C. The same film manufacturing process as Example 1 was followed to make a PCTFE copolymer film with different thickness, which was then subject to the stretching experiment on a laboratory stretcher using the same optimum conditions established in Example 1. Compared to Example 1, the orientability of PCTFE copolymer is better than PCTFE homopolymer as can be seen from Table 1 based on uniaxial drawing of the monolayer film. Through copolymerization with poly (vinylidene fluoride), PCTFE copolymer was even able to be biaxially stretched. However, only limited success was observed in the biaxial drawing both in simultaneous or sequential orientation, i.e., orientability is equal to 0.1 or less. The physical properties of a cast monolayer PCTFE copolymer film are listed in Table 1, 2, and 3 for comparison.

Example 3

A five layer laminate was co-extruded using a PCTFE homopolymer, a poly(ethylene terephthalate) (melting temperature: 254° C., intrinsic viscosity: 0.95, made by Allied-Signal Inc.), and a maleic anhydride modified polyolefin tie resin (density: 0.88 gm/cc, melt index: 1.0 gm/10 min. at 190° C., an ethylene-propylene-vinyl acetate copolymer manufactured by Mitsui Petrochemical Industries, Ltd.- Admer SF 700) to make the following structure: PET/tie resin/PCTFE homopolymer/tie resin/PET. Poly(ethylene terephthalate), after drying at 150° C. for four hours, was extruded through a 3.8 cm (1½") diameter Killion single screw extruder (L/D)=24/1) equipped with three heating zones and two adaptors. The extruder temperature profiles were set at 249° C., 268° C., 268° C. for the zone 1–3 and the adaptors were maintained at 268° C. The melt temperature was 265° C. The maleic anhydride modified tie resin was extruded through a 3.2 cm (1¼") diameter Killion single screw extruder equipped with four heating zones and two adaptors. The extruder temperature profiles were set at 238° C., 249° C., 260° C., 266° C. for the zone 1–4 and the adaptors were maintained at 266° C. The resulting melt temperature was 263° C. The fluoropolymer was extruded following the same procedures described in Example 1. The five layer extrudate, after passing through a coextrusion film die maintained at 282° C., was then cast on a roll kept at 38° C., followed by a cooling roll set at 32° C. The resultant film had a thickness of 25 μm. Films with various thickness up to 254 μm were also made for subsequent stretching experiment, which was performed in a laboratory stretcher immediately after the cast films were made.

The same stretching procedures, as described in Example 1, were followed. The layer thickness of the PCTFE homopolymer is about 25% of the total thickness, while the poly(ethylene terephthalate) layers and the tie layers consist of the remaining 75% of the total thickness. In order to make direct comparison in the test properties PCTFE homopolymer layer, after the stretching experiment, was then carefully separated from other layers in the multilayer film. Since the adhesion among the layers were not optimized, the PCTFE homopolymer layer can be separated from other polymers when carefully done. There was no distortion or dimensional change before and after the layer separation. In this example, the cast films can be stretched in either machine direction (MD) or transverse direction (TD) with great ease, as evidenced by a 0.9 orientability in Table 1. Very minimum film breaks were observed. As can be seen from Table 1, its orientability in 4X uniaxial orientation is almost 9 times better than PCTFE homopolymer made by monolayer extrusion (Example 1), and is about the same as PCTFE copolymer made by monolayer extrusion (Example 2). The biggest improvement in orientability comes in the biaxial drawing. Not only can such a fluoropolymer multilayer film be biaxially stretched simultaneously with great ease, it was also, for the first time, shown excellent sequential orientability. The tensile modulus of the film increases with the stretch ratio. When stretch biaxially with the same stretch ratio in both directions, a balanced film was obtained which showed improved mechanical properties in both MD and TD, as seen in Table 2. The water vapor transmission rate of the fluoropolymer film significantly improved from 0.016 gm mil/100 in$^2$/day of the control, which is a monolayer film, at 100° F., 100% RH to 0.0081 of a biaxially oriented film sample that was stretched 3.5 times its original length in both directions, an almost 100% barrier improvement.

Example 4

A three layer laminate was coextruded using a PCTFE homopolymer and a poly(ethylene terephthalate) (melting temperature: 254° C., intrinsic viscosity: 0.95, made by AlliedSignal Inc.) to make the following structure: PET/PCTFE homopolymer/PET. Essentially this is the same structure as Example 2, except that in this example there are no tie layers and in example 2 a maleic anhydride modified polyolefin tie resin was used. Following the same coextrusion procedures, a three layer film was obtained with different thickness for the stretching experiment. The layer thickness of the PCTFE homopolymer is about 25% of the total thickness, while the poly(ethylene terephthalate) layers consist of the remaining 75% of the total thickness. In order to make direct comparison in the test properties PCTFE homopolymer layer, after the stretching experiment, was then carefully separated from poly(ethylene terephthalate) in this three layer film. Since the adhesion between layers were not optimized, the PCTFE homopolymer layer can be separated from other polylefins when carefully done. There was no distortion or dimensional change before and after the layer separation. In this example, the cast films of this three layer film can be stretched in either machine direction (MD) or transverse direction (TD) with great ease, similar to a five layer film in Example 3. Very minimum film breaks were observed. The same ease of orientability in biaxial orientation was also observed as Example 3. It is evident that an adhesive layer is not absolutely required to improve the orientability of a fluoropolymer, since about the same orientability was observed in film samples prepared in Example 3 and Example 4. The improved orientability in Example 3 and Example 4 can be attributed to the incorporation of an additional layer, i.e., PET, during the fluoropolymer film making process as compared to Example 1.

TABLE 1

ORIENTABILITY[1] OF PCTFE

| | Monolayer FP (Control) | | Coextruded Structure | |
|---|---|---|---|---|
| | Homo-polymer | Copolymer | 5 Layers with Tie | 3 Layers w/o Tie |
| Example No. | 1 | 2 | 3 | 4 |
| Uniaxially; | | | | |
| 3× MD only | 0.5 | 0.9 | 0.9 | 0.9 |
| 4× MD only | <0.1 | 0.9 | 0.9 | 0.9 |
| 4× TD only | 0.1 | 0.9 | 0.9 | 0.9 |
| Biaxially: | | | | |
| Simultaneously | | | | |
| 3 × 3 | 0 | 0.1 | 0.7 | 0.7 |
| 3.5 × 3.5 | 0 | 0.1 | 0.9 | 0.9 |
| 4 × 4 | 0 | 0.1 | 0.9 | 0.9 |
| Sequentially: | | | | |
| 1.5 MD × 4 TD | 0 | <0.1 | 0.9 | 0.9 |
| 2 MD × 4 TD | 0 | <0.1 | 0.8 | 0.8 |
| 3 MD × 4 TD | 0 | <0.1 | 0.5 | 0.5 |

[1]Orientability is a measure defined as the ratio of total numbers of successfully stretched samples to total numbers of samples tried at an optimum stretching condition.
MD: Machine Direction
TD: Transverse Direction

TABLE 2

PHYSICAL PROPERTIES OF PCTFE

| | Crystal-linity, % | Dimensional Stability, % 10 Min. @ 300° F. | | Tensile Modulus, MPa (kPSI) | | Ex. No. |
|---|---|---|---|---|---|---|
| | | MD | TD | MD | TD | |
| Cast Monolayer Homopolymer | 29% | 10 | −11 | 1123 (163) | 1054 (153) | 1 |
| Cast Monolayer Copolymer | 27% | 2 | −2 | 1309 (190) | 1171 (1700 | 2 |
| Cast 5 Layer | 41% | −1 | 0 | 1054 (153) | 1034 (150) | 3 |
| 4× MD Oriented 5 Layer[2] | 45% | −15 | −5.5 | 1860 (270) | 1378 (200) | 3 |

TABLE 2-continued

PHYSICAL PROPERTIES OF PCTFE

| | Crystallinity, % | Dimensional Stability, % 10 Min. @ 300° F. | | Tensile Modulus, MPa (kPSI) | | Ex. No. |
|---|---|---|---|---|---|---|
| | | MD | TD | MD | TD | |
| 4× TD Oriented 5 layer[2] | 45% | −7.1 | −14 | 1412 (205) | 1943 (282) | 3 |
| 3.5 × 3.5 Simultaneous Biaxially Oriented 5 Layer[2] | 47% | −13 | −14 | 2122 (308) | 2081 (302) | 3 |
| 1.5 MD × 4 TD Sequentially Oriented 5 Layer | 45% | −10 | −16 | 1412 (205) | 2088 (303) | 4 |
| Cast 3 Layer | 44% | −1 | 0 | 1102 (160) | 1068 (155) | 4 |
| 4× TD oriented 3 Layer[2] | 46% | −7.5 | −15 | 1723 (250) | 1929 (280) | 4 |
| 3.5 × 3.5 Simultaneous Biaxially Oriented 3 Layer[2] | 48% | −15 | −15 | 2163 (314) | 2136 (310) | 4 |
| 1.5 MD × 4 TD Sequential Biaxially Oriented 3 Layer[2] | 46% | −9 | −15 | 1447 (210) | 2143 (311) | 4 |

[1]WVTR: Water Vapor Transmission rate in gm mil/100in²/day at 100° F., 100% RH.
[2]Samples were not annealed. MD: Machine Direction, TD: Transverse Direction

TABLE 3

BARRIER PROPERTIES OF PCTFE

| | WVTR[1] | Example No. |
|---|---|---|
| Cast Monolayer Homopolymer | 0.016 | 1 |
| Cast Monolayer Copolymer | 0.035 | 2 |
| Cast 5 Layer | 0.016 | 3 |
| 4× MD Oriented 5 Layer[2] | 0.0098 | 3 |
| 4× TD Oriented 5 Layer[2] | 0.010 | 3 |
| 3.5 × 3.5 Simultaneous Biaxially Oriented 5 Layer[2] | 0.0081 | 3 |
| 1.5 MD × 4 TD Sequentially Biaxially Oriented 5 Layer[2] | 0.0088 | 3 |
| Cast 3 Layer | 0.015 | 4 |
| 4× TD Oriented 3 Layer[2] | 0.0103 | 4 |
| 3.5 × 3.5 Simultaneous Biaxially Oriented 3 Layer[2] | 0.0080 | 4 |
| 1.5 MD × 4 TD Sequentially Biaxially Oriented 3 Layer | 0.0089 | 4 |

[1]WVTR Water Vapor Transmission Rate in gm mil/100 in²/day at 100° F., 100% RH, measured in a MOCON instrument according to ASTM Test Method F1249.
[2]Samples were not annealed. MD: Machine Direction, TD: Transverse Direction It has been found that both semi-crystalline and highly crystalline fluropolymer films, such as PCTFE films, when combined with thermoplastic films, such as PET, can be easily stretched both uniaxially and biaxially, even to a high degree of stretching.

It can be seen that the present invention provides highly oriented dimensionally stable fluoropolymer containing films which possess improved mechanical properties and water vapor barrier capability. The films can be stretched uniaxially in either direction or biaxially.

The films of this invention are useful as flat films or can be formed, such as be thermoforming, into desired shapes. The films are useful for a variety of end applications, such as for medical packaging, pharmaceutical packaging and other industrial uses. For example, the films can be used in constructions to form blister packs for pills and other pharmaceuticals.

What is claimed is:

1. A multilayer film which comprises at least one fluoropolymer layer and at least one thermoplastic layer comprising at least one thermoplastic homopolymer or copolymer, attached to a surface of the fluoropolymer layer by an intermediate adhesive layer, which film has been biaxially stretched at least 1.5 times in each of its longitudinal and transverse directions, and wherein each of the fluoropolymer layer, adhesive layer and thermoplastic layer have a viscosity of less than or equal to about 10,000 Pascal seconds at a temperature in the range of from about 280° C.; to about 400° C. wherein each of the fluoropolymer layer, adhesive layer and thermoplastic layer have on average no embedded particles having a diameter of greater than about 800 μm, no more than about 22 particles having a diameter of from about 400 to about 800 μm, no more than about 215 particles having a diameter of from about 200 to about 400 μm and no more than about 538 particles having a diameter of from about 100 to about 200 μm per square meter of film.

2. The multilayer film of claim 1 further comprising another thermoplastic layer comprising at least one thermoplastic homopolymer or copolymer attached to another surface of the fluoropolymer layer by another intermediate adhesive layer.

3. The multilayer film of claim 1 wherein the adhesive layer is comprised of at least one polyolefin having at least one functional moiety of an unsaturated carboxylic acid or anhydride thereof.

4. The multilayer film of claim 1 wherein the adhesive layer is comprised of a polyolefin having at least one functional moiety of maleic anhydride.

5. The multilayer film of claim 1 further comprising another layer of a fluoropolymer attached to another surface of the thermoplastic layer of the thermoplastic homopolymer or copolymer by another intermediate adhesive layer.

6. The multilayer film of claim 1 wherein the fluoropolymer is selected from the group consisting of chlorotrifluoroethylene homopolymers, chlorotrifluoroethylene containing copolymers and blends thereof.

7. The multilayer film of claim 1 wherein each of the fluoropolymer layer, adhesive layer and thermoplastic layer have on average no more than about 0.36 embedded bubbles having a diameter of greater than about 3100 μm, no more than about 22 bubbles having a diameter of from about 1500 to about 3100 μm, and no more than about 161 bubbles having a diameter of less than about 1500 μm per square meter of film.

8. The multilayer film of claim 1 wherein each of the fluoropolymer layer, adhesive layer and thermoplastic layer have a viscosity of from about 3,000 to about 10,000 Pascal seconds at a temperature in the range of from about 280° C. to about 400° C.

9. The multilayer film of claim 1 wherein the fluoropolymer is a poly(chlorotrifluoro ethylene) homopolymer.

10. The multilayer film of claim 1 wherein the fluoropolymer is a poly(chlorotrifluoro ethylene) containing copolymer.

11. The multilayer film of claim 1 wherein the thermoplastic layer comprises a material selected from the group consisting of polyolefins, polyamides, polyesters, polystyrene, polycarbonates, vinyl polymers, and copolymers and blends thereof.

12. The multilayer film of claim 1 wherein said thermoplastic layer comprises a polyester.

13. The multilayer film of claim 1 which has been biaxially stretched from at least 1.5 times to about ten times in each of its transverse and longitudinal directions.

14. An article which is thermoformed from said multilayer film of claim 1.

15. A method of producing an oriented, multilayer film which comprises coextruding at least one layer of a fluoropolymer, and at least one thermoplastic layer comprising a thermoplastic homopolymer or copolymer attached to a surface of the fluoropolymer layer by a coextruded intermediate adhesive layer, wherein said coextruding is conducted at a temperature of from about 280° C. to about 400° C.; casting the film and then biaxially stretching the film at least 1.5 times in each of its longitudinal and transverse directions; wherein each of the fluoropolymer layer, adhesive layer and thermoplastic layer have on average no embedded particles having a diameter of greater than about 800 $\mu$m no more than about 22 particles having a diameter of from about 400 to about 800 $\mu$m, no more than about 215 particles having a diameter of from about 200 to about 400 $\mu$m and no more than about 538 particles having a diameter of from about 100 to about 200 $\mu$m per square meter of film.

16. The method of claim 15 further comprising coextruding another thermoplastic layer of a thermoplastic homopolymer or copolymer to another surface of the fluoropolymer layer by another intermediate adhesive layer which is comprised of a polyolefin having at least one functional moiety of an unsaturated carboxylic acid anhydride.

17. The method of claim 15 comprising coextruding and attaching another layer of a fluoropolymer to another surface of the thermoplastic layer by another intermediate adhesive layer comprised of a polyolefin having at least one functional moiety of an unsaturated carboxylic acid or anhydride thereof.

18. The method of claim 15 wherein the intermediate adhesive layer is comprised of a polyolefin having at least one functional moiety of an unsaturated carboxylic acid or anhydride.

19. The method of claim 15 wherein the fluoropolymer is a poly(chlorotrifluoro ethylene) homopolymer or copolymer.

20. The method of claim 15 wherein the thermoplastic layer is selected from the group consisting of polyolefins, polyamides, polyesters, polystyrene, polycarbonates, vinyl polymers, and copolymers and blends thereof.

21. The method of claim 15 wherein said thermoplastic layer comprises a polyester.

22. The method of claim 15 wherein the film is biaxially stretched from at least 1.5 times to about ten times in each of its longitudinal and transverse directions.

23. The method of claim 15 wherein the biaxial stretching is performed is simultaneously.

24. The method of claim 15 wherein the biaxial stretching is performed sequentially.

25. A method of producing an oriented, multilayer film which comprises laminating at least one layer of a fluoropolymer to the surface of a layer of a thermoplastic homopolymer or copolymer by an intermediate adhesive layer, which intermediate adhesive layer is comprised of a polyolefin having at least one functional moiety of an unsaturated carboxylic acid anhydride and then biaxially stretching the film article at least 1.5 times in each of its longitudinal and transverse directions; wherein each of the fluoropolymer layer, adhesive layer and thermoplastic layer have on average no embedded particles having a diameter of greater than about 800 $\mu$m, no more than about 22 particles having a diameter of from about 400 to about 800 $\mu$m, no more than about 215 particles having a diameter of from about 200 to about 400 $\mu$m and no more than about 538 particles having a diameter of from about 100 to about 200 $\mu$m per square meter of film.

26. A multilayer film which comprises at least one fluoropolymer layer and at least one thermoplastic layer comprising at least one non-polyolefin thermoplastic homopolymer, non-polyolefin containing copolymer or blends thereof, attached to a surface of the fluoropolymer layer by an intermediate adhesive layer comprised of at least one polyolefin having at least one functional moiety of an unsaturated carboxylic acid or anhydride thereof, which film has been uniaxially stretched at least three times in one linear direction, and wherein each of the fluoropolymer layer, adhesive layer and thermoplastic layer have a viscosity of less than or equal to about 10,000 Pascal seconds at a temperature in the range of from about 280° C. to about 400° C.; wherein each of the fluoropolymer layer, adhesive layer and thermoplastic layer have on average no embedded particles having a diameter of greater than about 800 $\mu$m, no more than about 22 particles having a diameter of from about 400 to about 800 $\mu$m, no more than about 215 particles having a diameter of from about 200 to about 400 $\mu$m and no more than about 538 particles having a diameter of from about 100 to about 200 $\mu$m per square meter of film.

27. A multilayer film which comprises at least one fluoropolymer layer and at least one thermoplastic layer comprising at least one thermoplastic homopolymer or copolymer, attached directly to a surface of the fluoropolymer layer, which film has been biaxially stretched at least 1.5 times in each of its longitudinal and transverse directions, and wherein each of the fluoropolymer layer and thermoplastic layer have a viscosity of less than or equal to about 10,000 Pascal seconds at a temperature in the range of from about 280° C. to about 400° C.; wherein each of the fluoropolymer layer, adhesive layer and thermoplastic layer have on average no embedded particles having a diameter of greater than about 800 $\mu$m, no more than about 22 particles having a diameter of from about 400 to about 800 $\mu$m, no more than about 215 particles having a diameter of from about 200 to about 400 $\mu$m and no more than about 538 particles having a diameter of from about 100 to about 200 $\mu$m per square meter of film.

* * * * *